United States Patent
Pearson (10) Patent No.: US 6,992,715 B2
(45) Date of Patent: Jan. 31, 2006

(54) ROW DECODING SCHEME FOR DOUBLE SAMPLING IN 3T PIXEL ARRAYS

(75) Inventor: Michael Pearson, Ottawa (CA)

(73) Assignee: Psion Teklogix Systems Inc., Mississauga (CA)

(*) Notice: Subject to any disclaimer, the term of this patent is extended or adjusted under 35 U.S.C. 154(b) by 682 days.

(21) Appl. No.: 09/970,847

(22) Filed: Oct. 4, 2001

(65) Prior Publication Data

US 2002/0089597 A1  Jul. 11, 2002

Related U.S. Application Data

(60) Provisional application No. 60/260,641, filed on Jan. 11, 2001.

(51) Int. Cl.
H04N 5/217 (2006.01)
H04N 3/14 (2006.01)
H04N 5/335 (2006.01)
H01L 27/00 (2006.01)

(52) U.S. Cl. ............... 348/302; 348/308; 348/241; 250/208.1

(58) Field of Classification Search ............ 348/308, 348/300–302, 304, 241–242, 250–251, 257, 348/294, 607, 615; 250/208.1
See application file for complete search history.

(56) References Cited

U.S. PATENT DOCUMENTS

| 5,410,348 | A | 4/1995 | Hamasaki |
| 6,218,656 | B1 * | 4/2001 | Guidash ............... 250/208.1 |
| 6,410,899 | B1 * | 6/2002 | Merrill et al. ......... 250/208.1 |
| 6,624,850 | B1 * | 9/2003 | Guidash ................. 348/308 |
| 6,864,919 | B2 | 3/2005 | Hua |

FOREIGN PATENT DOCUMENTS

| EP | 0 569 202 A2 | 11/1993 |
| WO | WO 99/05853 | 2/1999 |

* cited by examiner

Primary Examiner—Ngoc-Yen Vu
Assistant Examiner—Kelly Jerabek
(74) Attorney, Agent, or Firm—Pearne & Gordon LLP

(57) ABSTRACT

The invention disclosed is directed to a method and apparatus which allows a "rolling shutter" type of read out sequence in a pixel array that is read using a double sampling technique by having the rows of pixels reset a second time in each of their cycles for a second sampling while the rows are being accessed for reading. In this way, each pixel is sampled to compare its voltage level after integration to its voltage level as it is reset. In accordance with the present invention, the row access signal or a signal that is used to generate the row access signal, is used to generate a second reset signal at the correct time while the row is being accessed. The invention is particularly applicable to image sensors having light sensitive elements that are CMOS pixels, and in particular three transistor pixels.

5 Claims, 7 Drawing Sheets

ROW DECODING SCHEME FOR DOUBLE SAMPLING IN 3T PIXEL ARRAYS

This application claims the benefit of U.S. Provisional Patent Application Ser. No. 60/260,641 filed on Jan. 11, 2001.

FIELD OF THE INVENTION

The invention relates generally to image scanning devices and in particular to CMOS image sensors

BACKGROUND OF THE INVENTION

As telecommunication devices and personal digital assistants increase in popularity so do their demand for new and interesting features. Such features may include digital video communication, or imbedded image capture apparatus. One device that may assist in the creation of this feature is the CMOS image sensor.

A CMOS image sensor is a semiconductor device that contains an array of light sensitive pixel elements arranged in rows and columns, for the conversion of light energy into an electrical signal. Also, digital signal processing circuitry may be integrated onto the same die as the CMOS image sensor, allowing the reduction in size of the amount of peripheral circuitry needed to interface with the image sensor. As well, CMOS image sensors and the processing circuitry can be manufactured using current standard CMOS fabrication techniques, giving it a significant cost advantage over using the alternative CCD (charge coupled device) image sensor which requires special manufacturing techniques.

Figure 1:
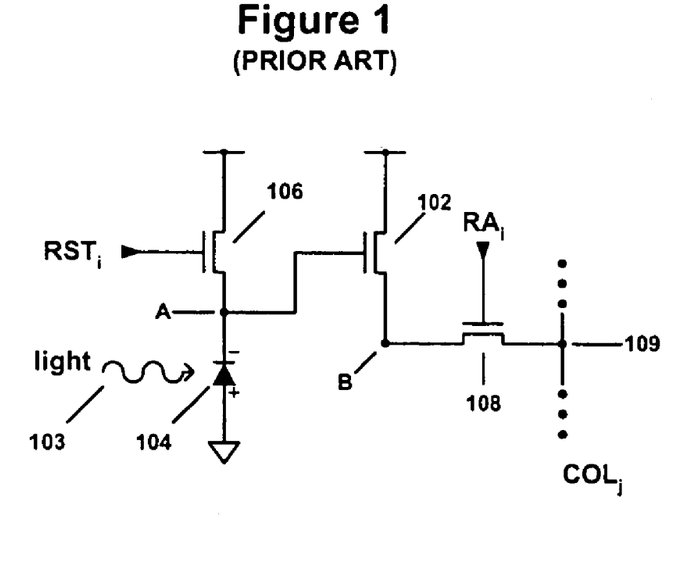
FIG. 1 is a schematic diagram of a conventional 3T pixel found in CMOS imagers.

There are different types of pixel structures that can be used in a CMOS imager. One of these is a 3T (three-transistor) pixel, an example of which is shown in FIG. 1. Typically, a read cycle is initiated by applying a pulse of the reset signal $RST_i$ to reset transistor 106 to set node A to a known voltage. The integration begins once the reset pulse is completed. The photodiode 104 is exposed to light 103 and discharges node A at a given rate depending on the intensity of the light 103. As node A is being discharged, a source follower transistor 102 amplifies the node A voltage onto node B. Once the integration is completed and node A is appreciably discharged, the row access signal $RA_i$ pulses and activates the row access transistor 108. This allows the amplified voltage on node B to be dumped onto the column 109, where it is amplified and sent through a column data path. From the data path, the data is then processed by signal processing circuitry either on or off the chip.

Figure 2:
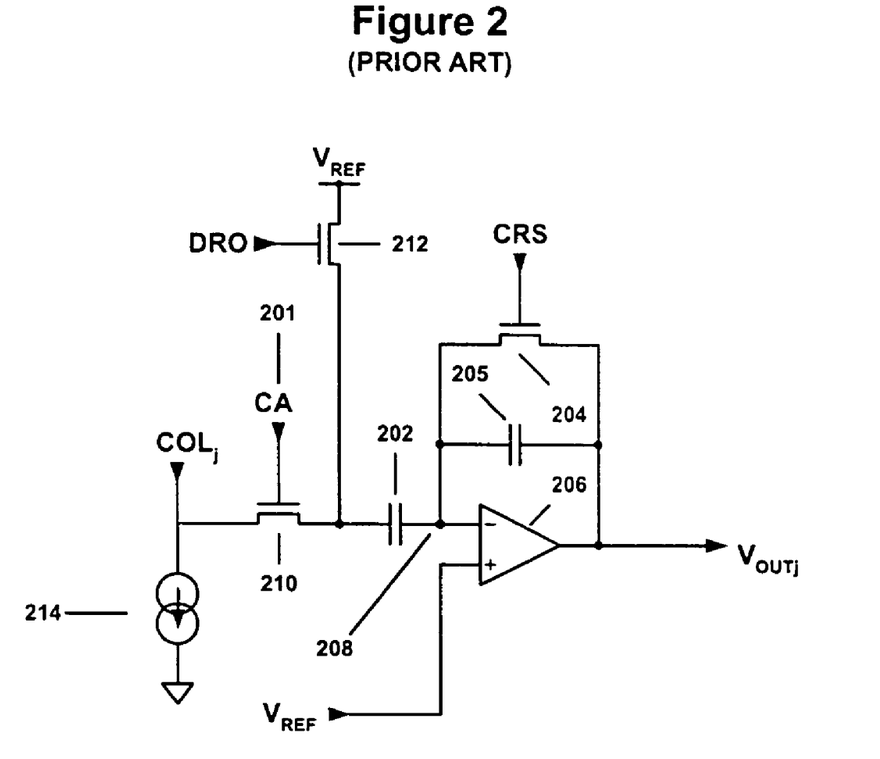
FIG. 2 is a schematic diagram of a conventional column level amplifier found in CMOS imagers.

An example of a column amplifier stage is shown in FIG. 2. The column amplifier stage includes an operational amplifier 206, capacitors 202 and 205 and transistors 210, 212 and 204. The column bit-line $COL_j$ is connected to the source of transistor 210. The column amplifier stage read sequence is described in conjunction with FIG. 3. Prior to the row access pulse, during the integration stage, the Column Access signal CA is a logical low. Once the row is accessed, the row access pulse $RA_i$ is a logical high and the source follower 102 drives the column line 109 to its video signal level. During this time the sampling capacitor 202 and the feedback capacitor 205 are set to a reference voltage $V_{REF}$. Then the Direct Readout signal DRO switches to a logical low followed by the Column Access signal CA which switches to a logical high. From this point in time, the video level of the column line $COL_j$ is being sampled. Then the Column Reset signal CRS switches to a logical low followed by the Column Access signal CA which switches to a logical low. After Direct Readout signal DRO switches to a logical high the output voltage $V_{OUTj}$ becomes valid until the Column Reset signal CRS switches to a logical high.

Figure 3:
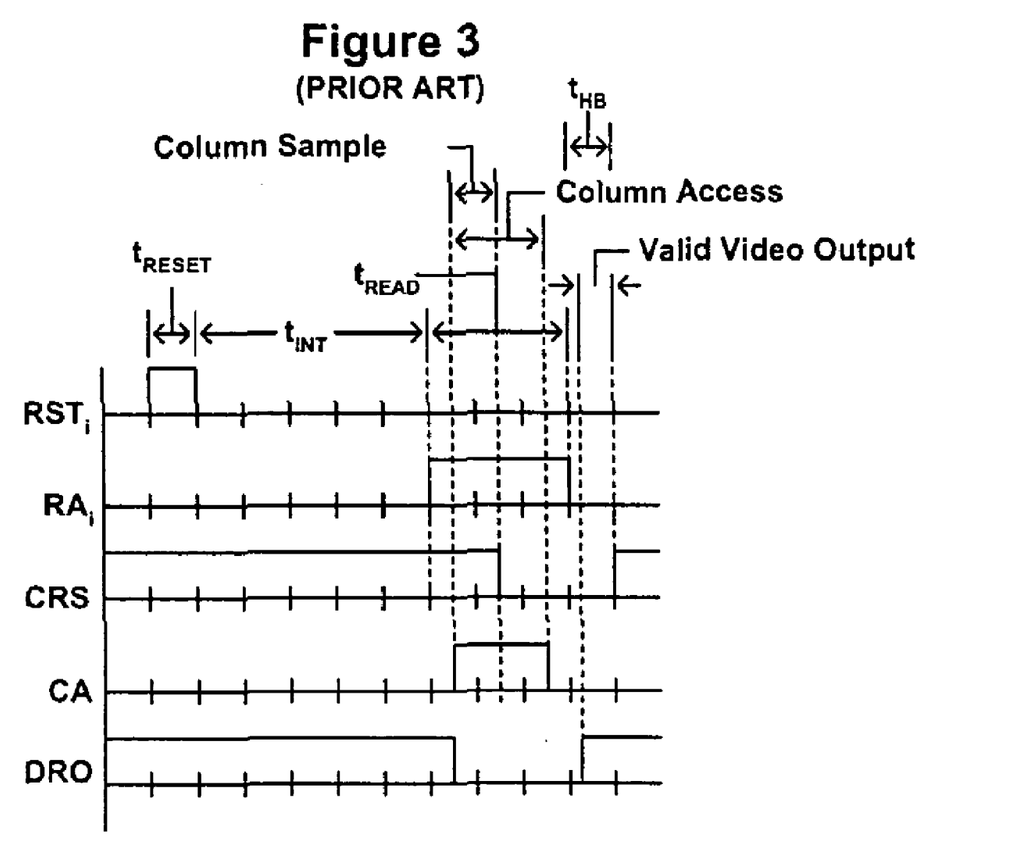
FIG. 3 is a timing diagram of an integration time for a 3T pixel.
Figure 4:
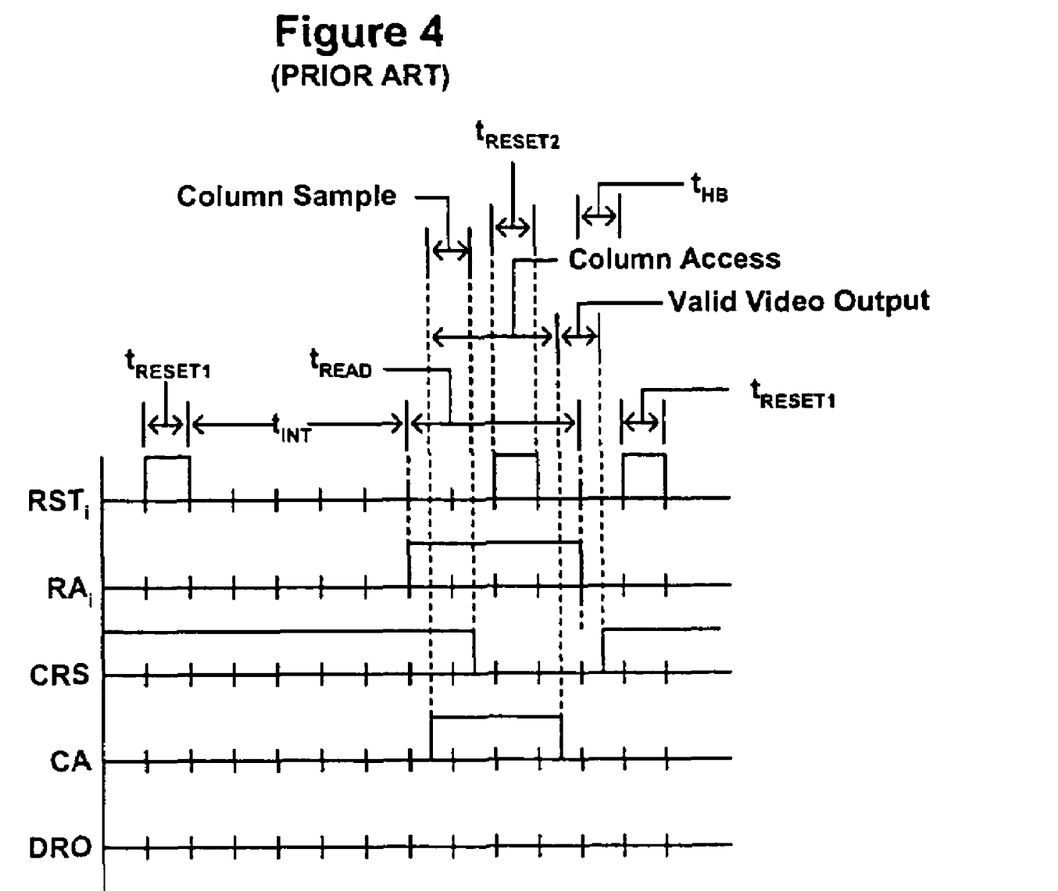
FIG. 4 is a timing diagram of an integration time for a 3T pixel using double sampling.

The read sequence described above and illustrated in FIG. 3 has some inherent deficiencies. Throughout the array of pixel elements there will be variations in the device characteristics due to variations in the device processing. For example the threshold voltage of transistor 106 in FIG. 1 may vary across the array causing the reset voltage to be at different levels in the pixels from column to column and row to row. Any of the devices in the pixel and/or column current source 214 in FIG. 2 can have these variations as well. A known method has been developed in the industry to alleviate this problem. The method, referred to as double sampling, is used to measure the difference between the reset voltage and the integrated voltage. In this way, the device variation is subtracted. Double Sampling (DS) requires a normal read sequence as was shown in FIG. 3 with an additional reset pulse at the end of the integration time. When using a double sampling technique the subtraction is done after the integrated photodiode voltage has been sampled. A timing sequence for double sampling is shown in FIG. 4. Details of the double sampling method is well known and will not be further described here.

The frame rate for a CMOS sensor array is one of the most critical figures of merit. The frame rate is the speed by which an entire array of pixels can be read. Typically an entire row of pixels can be reset, integrated and read out in parallel.

When an entire imaging array is to be read, there are at least two methods that can be used. The slower of the two methods uses a row by row technique where the entire timing cycle as shown in FIGS. 3 and 4 are completed before the sequence begins on the next row, which is not necessarily adjacent. The frame rate $t_{FRAME1}$ is then limited to the time $t_{RESET}$ required to reset, the time $t_{INT}$ required to integrate, the time $t_{READ}$ required to read each row and the time $t_{HB}$ (known as horizontal blank time) required to switch to the next row multiplied by the number $N_{ROWS}$ of rows of the entire array. Or, in other words:

$$t_{FRAME1} = N_{ROWS} \times (t_{RESET} + t_{INT} + t_{READ} + t_{HB}) \quad \text{(Equation 1)}$$

In most circumstances, the integration time $t_{INT}$ is significantly longer then the reset time $t_{RESET}$, the read time $t_{READ}$ and the horizontal blank time $t_{HB}$.

Figure 5:
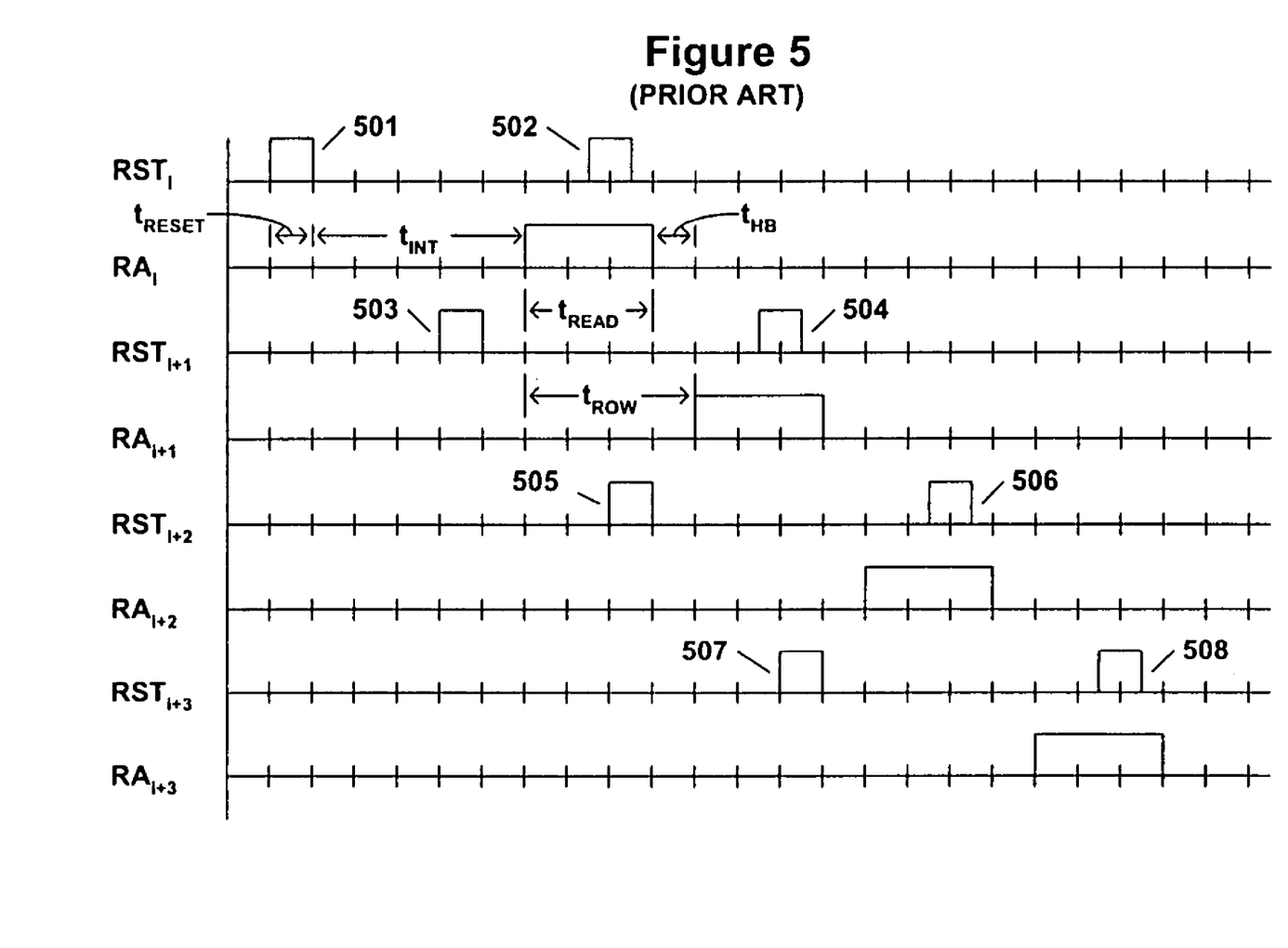
FIG. 5 is a timing diagram of an integration technique used for 3T pixels known as rolling shutter.

A faster technique, known in the industry as a "rolling shutter", is illustrated in FIG. 5. The technique involves overlapping the resets of later rows with respect to the integration of earlier rows. For example, reset pulse 503 for row $R_{j+1}$ occurs during the integration period of the pixels in row $R_j$, reset pulse 505 for row $R_{j+2}$ occurs during the integration period of the pixels in row $R_{j+1}$, reset pulse 507 for row $R_{j+3}$ occurs during the integration period of the pixels in row $R_{j+2}$, and so on for the remaining rows N. The time needed to readout the entire frame is significantly reduced due to the overlapping of the inter-row read sequences and is quantified by:

$$t_{FRAME2} = N_{ROW} \times t_{ROW} \quad \text{(Equation 2)}$$

where $t_{ROW} = t_{READ} + t_{HB}$

Equation 2 does not include the period of time $t_{RST} + t_{INT}$ which will occur as the first row of pixels is being reset and integrated before the reading of any pixels takes place.

Since the integration time $t_{INT}$ is usually much greater than the read time $t_{READ}$, in most cases we can achieve a much higher frame rate. In fact in some situations it is possible to achieve up to an order of magnitude of improvement. As can be seen in FIG. 5 for example, the resetting of each subsequent row now takes place after four units of time rather then 11 units of time. The minimum time between the resetting of row of pixels will be $t_{ROW}=t_{READ}+t_{HB}$ after the resetting of the preceding row.

This type of frame read sequence could be achieved by addressing the row reset and read lines independently with the use of two separate counters. This type of architecture is described in FIG. 6. The Reset Address Counter 610 receives external signals (not shown) that define a set number of row addresses to proceed through in the 3T CMOS sensor array 609. The Reset Address Counter 610 then sends the addresses in sequence to the Reset Decoders 605, via the Reset Address signal ($RSTAX_k$) lines 603. The Reset Decoders 605 then activate the n Reset Drivers 612, which then activate the corresponding Reset signal $RST_i$ lines 607, in accordance with the sequence of input addresses and a Reset Enable signal rst_en.

Figure 6:
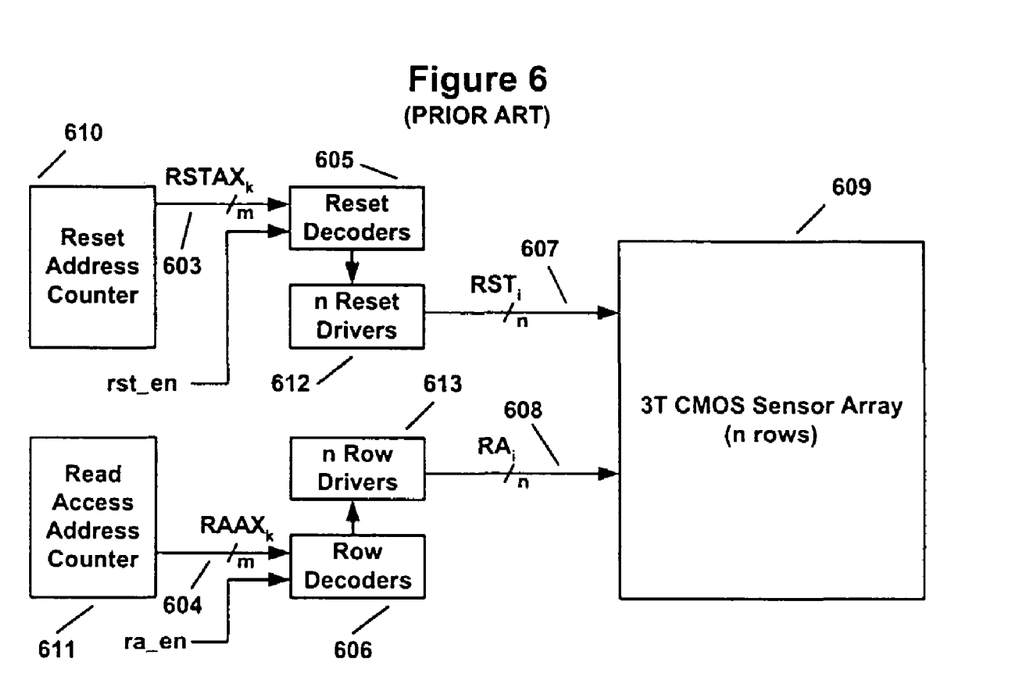
FIG. 6 is a simplified block diagram of conventional row decoding of a CMOS imager.

The Read Access Address Counter 611 also receives external signals (not shown) that define a set number of row addresses to proceed through in the 3T CMOS sensor array 609. The Read Access Address Counter 611 then sends the addresses in sequence to the Row Decoders 606, via the Row Access Address signal ($RAAX_k$) lines 604. The Row Decoders 606 then use that information to activate the corresponding Row Drivers 613, which in turn activate the appropriate Row Access signal $RA_i$ lines 608, in accordance with the sequence of input addresses and a Row Access Enable signal, ra_en.

There are a number of problems associated with the architecture described in FIG. 6, in particular when the array is to be read using double sampling. An embodiment of a double sampling technique is described in U.S. patent application Ser. No. 09/886,598 filed on Jun. 21, 2001, which is incorporated herein by reference. The read circuitry associated with the array 609 cannot necessarily change the reset addresses to perform a double sample reset. For instance, the second reset 502, 504, 506 on an earlier row may not be possible because a later row may be using that address to perform a pre-integration reset 503, 505, 507 as illustrated in FIG. 5. As shown in the FIG. 1, the potential overlap of a pre-integration reset with a double sampling reset depends upon the integration time used in reading the array.

It is desirable to be able to vary integration time of the array, as the integration time partially determines the output voltage of a pixel element. It is possible to avoid the above mentioned overlap and maintain an integration time that is variable using three methods known in the industry. The first method is to simply read out each row one at a time without using any overlap as already mentioned in the above text. However this method is not desirable, as it is extremely slow.

The second method requires a detailed understanding of the pixel array timing, wherein the use of potentially overlapping integration times are simply avoided through the use of a third set of addresses used explicitly for the double sampling reset address signal. However this method is not desirable as it is complex, and restricts the use of specific integration times that may be desirable.

The third method involves using shift registers to control the row reset and row access signals, instead of a binary decode method. However, using shift registers requires additional wait time to acquire sub-windows in particular parts of the array, as opposed to the random access functionality a binary decode method yields.

Therefore, there is a need for a new method that solves the problem of the first reset pulse in one row overlapping with the second reset pulse in a previous row. It is also desirable that this new method has a fast frame rate, is not overly complex in regards to timing or hardware, does not restrict the potentially available integration times and benefits from random accessibility.

SUMMARY OF THE INVENTION

The invention is directed to a method of controlling light sensitive elements arranged in rows and columns in an image sensor such that the elements are double sampled and the sensor operates in a roller shutter sensing sequence. The method comprises the steps of initially resetting a light sensitive element during a reset time $t_{RESET}$, reading the light sensitive element during a read time $t_{READ}$ after an integration time $t_{INT}$, and resetting the light sensitive element a second time during a portion of the read time $t_{READ}$. The second resetting time will preferably occur at the end of the read time $t_{READ}$.

In accordance with a further aspect of the invention, the light sensitive elements in each row are reset simultaneously and each successive row of light sensitive elements is sequentially reset after a time period $t_{ROW}$. In addition, $t_{ROW} \geq t_{READ}$, and more specifically, $t_{ROW} \geq (t_{READ}+t_{HB})$ where $t_{HB}$ is horizontal blank time.

The present invention is particularly applicable to image sensors having light sensitive elements that are CMOS pixels, and in particular three transistor pixels.

With regard to a further aspect, the present invention comprises an apparatus for controlling light sensitive elements arranged in rows and columns in an image sensor such that the elements are double sampled and the sensor operates in a roller shutter sensing sequence. The apparatus includes an element reset signal producing circuit, an initial reset circuit for controlling the element reset signal producing circuit to produce an initial reset signal, an element access signal producing circuit, and a double sample control circuit responsive to the element access signal producing circuit for controlling the element reset signal producing circuit to produce a second reset signal. The element reset signal producing circuit and the element access signal producing circuit may be used to apply signals to the elements in a row.

In accordance with another aspect of the invention, the apparatus for controlling light sensitive elements arranged in rows and columns in an image sensor such that the elements are double sampled and the sensor operates in a roller shutter sensing sequence may comprise a reset control circuit for providing reset signals to at least one light sensitive element in a row, a reset decode circuit for activating the reset control circuit to provide an initial reset signal to the at least one light sensitive element in the row, a row access decode circuit for providing a row access signal to the at least one light sensitive element in the row and a double sample control circuit having an input coupled to the row access decode circuit and an output coupled to the reset control circuit for activating the reset control circuit to provide a second reset signal to the at least one light sensitive element in the row.

This apparatus is particularly applicable to image sensors having light sensitive elements that are CMOS pixels, and in particular three transistor pixels. The reset control circuit, the reset decode circuit and the double sample control circuit may be NAND gates and the row access decode circuit may be an AND gate.

In addition, the apparatus may further include a reset driver coupled to the reset control circuit for generating the reset signals and a row access driver coupled to the row access decode circuit for generating the row access signal. Both drivers may be non-inverting amplifiers.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

The invention disclosed here allows the "rolling shutter" type of read out sequence in a pixel array that is read using a double sampling technique by having the rows of pixels reset a second time in each of their cycles for sampling while the rows are being accessed for reading. In this way, each pixel is sampled to compare its voltage level after integration to its voltage level as it is reset. In accordance with the present invention, the row access signal or a signal that is used to generate the row access signal, is used to generate a second reset signal at the correct time while the row is being accessed.

Figure 7:
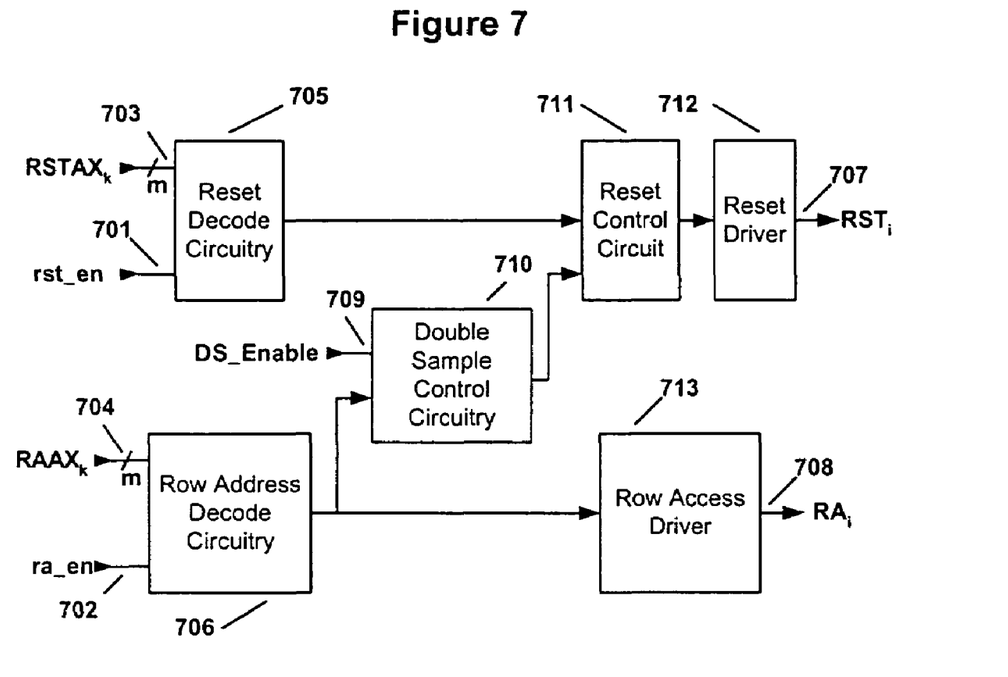
FIG. 7 is a simplified block diagram of the row decoding of a CMOS imager in accordance with the invention.

A block diagram of a device implementing this system is illustrated in FIG. 7. The Reset Address signals ($RSTAX_k$) on lines 703 are coupled to a Reset Decode Circuitry 705, for providing decoded reset address signals to a Reset Control circuit 711 when the Reset Enable signal rst_en on line 701 is active. The Reset Driver 712 is provided for driving signal $RST_i$ on lines 707. The Reset Control circuit 711 activates the Reset Driver 712 when it receives the appropriate control signals. Either the Reset Decode Circuitry 705 or the Double Sample Control Circuitry 710 can activate the Reset Control Circuit 711.

Row Access Address signals $RAAX_k$ on lines 704 are coupled to a Row Access Decode Circuitry 706 for providing decoded row access address signals to both the Double Sample Control Circuit 710 and to a Row Access Driver 713 when a Row Access Enable signal ra_en on line 702 is active. The Row Access Driver 713 activates a corresponding Row Access signal $RA_i$ on line 708 when provided with a row access address signal from the Row Access Decode Circuitry 706.

The Double Sample Control Circuitry 710 is coupled to the Reset Control Circuit 711 for providing the Reset Control Circuit 711 with an activate signal. This occurs when the Double Sample Control Circuitry 710 has been provided with both a Double Sample Enable signal DS_Enable on line 709 and with a decoded row access address signal from the Row Access Decode Circuitry 706. The Double Sample Control Circuitry 710, when activated, will force the second reset in the double sample read sequence.

Figure 8:
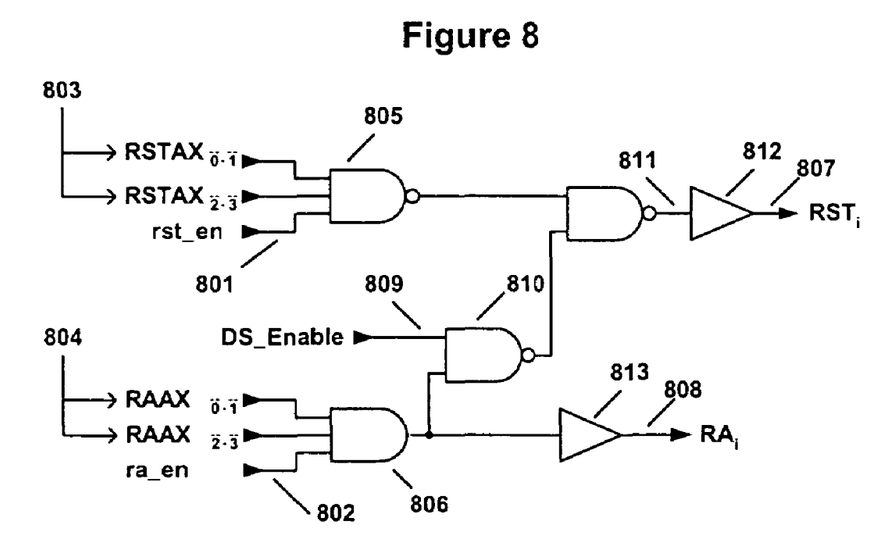
FIG. 8 is a schematic diagram of the row decoding block diagram shown in FIG. 7 in accordance with the invention.

One embodiment that performs the functionality of the block diagram in FIG. 7 is described in conjunction with FIG. 8. Though the circuit in FIG. 8 is a preferred embodiment, numerous other embodiments are also possible. For ease of reference, the elements in FIG. 8 have reference numbers with the last two digits that correspond to the last two digits of reference numbers identifying corresponding elements in FIG. 7.

The Pre-Decoded Reset Address signals $RSTAX_{0-1}$ and $RSTAX_{2-3}$ on lines 803 and a reset enable signal rst_en on line 801 are coupled to the inputs of a first NAND gate 805. The output of the first NAND gate 805 is coupled to one of the inputs of a second NAND gate 811 for providing a logical low activation signal in the case that all of the input signals to the first NAND gate 805 are at a logical high level. The output of the second NAND gate 811 is connected to the input of a non-inverting amplifier 812. The output of the amplifier 812 is the reset signal $RST_i$ on line 807.

The Pre-Decoded Row Access Address signals $RAAX_{0-1}$ and $RAAX_{2-3}$, on lines 804 and a Row Access Enable signal ra_en on line 802 are coupled to the three inputs of a first AND gate 806. The output of the first AND gate 806 is then coupled to an input of the third NAND gate 810 and to the input of the non-inverting amplifier 813. The output of the amplifier 813 is the row access signal $RA_i$ on line 808.

The third NAND gate 810 has its second input coupled to the Double Sample Enable signal DS_Enable on line 809. The third NAND gate 810 is then coupled at its output to the input of the second NAND gate 811 for providing a second logical low activation signal in the case that both of the input signals to the third NAND gate 810 are at a logical high level.

As mentioned, the second NAND gate 811 is coupled at its first input to the output of the first NAND gate 805, and the second input is coupled to the output of the third NAND gate 810. If either or both of these input signals is at a logical low level, then the Reset signal $RST_i$ on line 807 is driven through the amplifier 812 to an active logical high level. This allows the reset signal $RST_i$ on line 812 to be active for the initial resetting of the pixel before the integration time by means of the first NAND gate 805. It also allows the reset signal $RST_i$ on line 812 to be active for the double sampling reset after the integration period by means of the third NAND gate 810.

Figure 9:
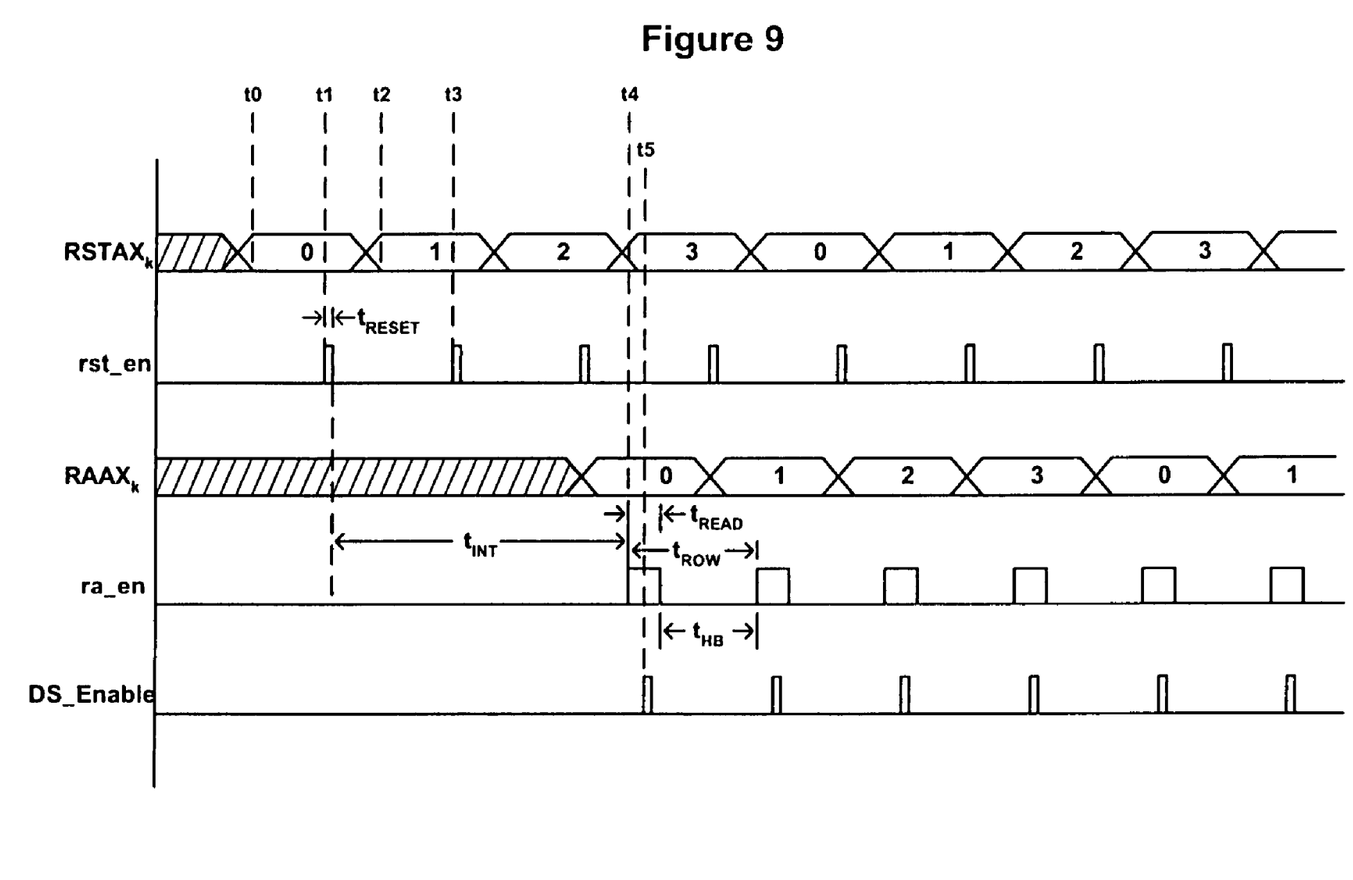
FIG. 9 is a simplified timing diagram of the row decoding in accordance with the invention.

The timing of a CMOS imager that uses the circuitry described in FIG. 8 is shown in detail in FIG. 9. This diagram is being simplified for description purposes by having the imaging array consist of only four rows, labeled as 0–3. In this particular case, four circuits of the type described with reference to FIG. 8 would be used, one for each of the rows of pixels. The first waveform in the timing diagram shows the number of the row that is being decoded for reset, the first being 0 at time t0. The first NAND gate 805 of the corresponding circuit will output a logical active low once the Reset Enable signal rst_en pulses a logical high as shown at time t1. This will drive the Reset Signal $RST_i$ for that row logical high and reset all the pixels in row 0. Once the next address is given, shown as row address 1 at time t2, the circuit corresponding to row 1 will reset the pixels in that row once the Reset Enable signal rst_en pulses a logical high a second time as shown at time t3. Meanwhile, row 0 is being integrated as shown by the time labeled $t_{INT}$. The reset process continues for each row until the end of the array and then begins again at the first row.

Meanwhile, the decoding of the Row Access signals $RAAX_k$ is occuring in the Row Access decoding circuitry and being input to the third AND gate 806 in each of the four circuits. The first AND gate 806 of row 0 will be active once the Row Access Enable signal ra_en pulses a logical high as shown at time t4 as the decoded address is row 0. The pulse ends the integration time, $t_{INT}$, of the pixel for row 0 as shown and the integrated voltage level of the pixel is read out at this time. This process continues for each of the rows until the end of the array at which time the first row, row 0, is again accessed.

Once the integrated voltage is read out of the pixel, the reset signal needs to be pulsed again in order to sample the reset voltage. This occurs for row 0 at time t5 where the Double Sample Enable signal DS_Enable pulses a logical high while the Row Access Enable signal, ra_en is also still a logical high. Referring to FIG. 8 it can be seen why this is the case. The Pre-Decoded Row Access signals $RAAX_k$ are decoded for row 0 and the Row Access Enable signal, ra_en is still a logical high. Therefore, the output of the first AND gate 806 is a logical high and is coupled to one of the inputs of the third NAND gate 810. Once the Double Sample Enable signal DS_Enable which is coupled to the second input of the third NAND gate 810 also pulses to a logical high level the output of the third NAND gate 810 will be a logical low. This is coupled to the input of the second NAND gate 811 and will force the output of the second NAND gate 811 to a logical active high. Through the amplifier 812 the Reset Signal $RST_i$ will be driven to an active high level that will reset row 0 for the second time. At this time the read circuitry samples the reset voltage and the subtraction is done. This process of the reset signals being driven by the row access path continues through the array similarly to the reset and row access signals.

This invention provides several advantages over the prior art. The invention allows the overlapping of the resets of later rows with respect to the integration of earlier rows. Furthermore, it does so without the addition of another set of addresses or any complicated timing sequence. Also it allows the simple adjustment of the integration time by controlling only the time at which the row access signals are applied.

Thus a unique and useful row decoding scheme for a CMOS imager has been described above. However, the invention is not necessarily limited to CMOS imagers, the invention could be used in any circumstance where double sampling is used. The invention should also not be limited by the circuit described in FIG. 8 as this is only one of many potential embodiments.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method of controlling light sensitive elements arranged in rows and columns in an image sensor for a roller shutter sensing sequence and wherein the elements are double sampled comprising the steps of:
   a. resetting each of the light sensitive elements in a given row substantially simultaneously for a time period $t_{RESET}$; and
   b. sequentially resetting each successive row of light sensitive elements after a time period $t_{ROW}$;
   c. reading the light sensitive elements in the given row after an integration time $t_{INT}$ during a read time $t_{READ}$; and
   d. resetting the light sensitive elements in the given row a second time during a portion of the read time $t_{READ}$; wherein $t_{ROW} \geq t_{READ}$.

2. A method as claimed in claim 1 wherein the light sensitive elements are CMOS pixels.

3. A method as claimed in claim 2 wherein the CMOS pixels are three transistor pixels.

4. A method as claimed in claim 1 wherein $t_{ROW} \geq (t_{READ} + t_{HB})$ where $t_{HB}$ is horizontal blank time.

5. A method as claimed in claim 1 wherein the second resetting time occurs towards the end of the read time $t_{READ}$.

* * * * *